Patented Aug. 12, 1952

2,606,885

UNITED STATES PATENT OFFICE 2,606,885

MODIFIED DICYANDIAMIDE RESINS AND PROCESSES OF PREPARING THE SAME

Alfred F. Schmutzler, Teaneck, N. J., assignor to American Cyanamid Company, New York, N. Y., a corporation of Maine No Drawing. Application February 17, 1950, Serial No. 144,859

10 Claims. (Cl. 260—33.4)

This invention relates to a class of novel resins and more particularly to water insoluble glycolated dicyandiamide aldehyde resins and processes of preparing the same. This invention further relates to printing inks and more particularly to heat setting and steam setting printing inks comprising water insoluble glycolated dicyandiamide aldehyde resins. A further object of the present invention is to produce printing inks containing glycolated dicyandiamide aldehyde resins, which are suitable for letter press and gravure printing.

One of the objects of the present invention is to produce glycolated dicyandiamide aldehyde resins which are substantially water insoluble and which will precipitate from solution upon the addition of water in which case the precipitate will be in the nature of a solid resin. A further object of the present invention is to produce the glycolated dicyandiamide aldehyde resins which are adaptable for use in a number of applications, but particularly in the field of printing inks. The resins of the present invention when used in the preparation of printing inks can be adapted for use as heat setting, steam setting and air drying, letter press and gravure inks. A still further object of the present invention is to produce printing inks which will dry with a high luster and with a very hard and smudge proof surface. A further object of the present invention is to produce glycolated dicyandiamide resins which are useful as paper coating materials and as adhesives. These and other objects of the present invention will be discussed more fully hereinbelow in the further amplification of my invention.

In the preparation of these resins, it is possible to modify the process considerably within certain limits but, generally speaking, these resins may be prepared by introducing dicyandiamide and an aldehyde into a suitable reaction chamber and causing these materials to undergo preliminary reaction and to form the methylol groups, thereafter reacting with a glycol until the ether derivative of the methylol dicyandiamide is substantially completely formed. As an alternative procedure, one could introduce the dicyandiamide, aldehyde, and the glycol into a suitable reaction chamber and permit these materials to react until the ether derivative of the methylol dicyandiamide is formed.

In either of these alternative methods, it is desired to maintain the pH of the reaction mixture on the alkaline side, preferably within the pH range of 7-10 and, for optimum results, within the pH range of 8-9. This preparation can be accomplished at any temperature from room temperature to 100° C., but it is preferred to use temperatures in the order of magnitude of 60-100° C. After the methylol derivative has been substantially completely formed, water is expelled preferably by azeotropic distillation. One should add a mutually inert hydrocarbon solvent having a boiling point below 100° C. The amount of inert hydrocarbon solvent which one should add is not particularly critical and may be varied over a fairly wide range. However, in the interest of economy, it is actually desired to add a comparatively small amount of the solvent such as about 5% to about 20% by weight of solvent based on the total weight of the resin forming materials. The elimination of the water causes ether formation between the methylol dicyandiamide and the glycol. The ether derivative thus formed is later polymerized after the bulk of the hydrocarbon has been distilled off by heating at temperatures not exceeding 135° C. because above that temperature the resins will have a tendency to undergo partial decomposition. It is actually preferred that the polymerization step be accomplished at temperatures within the range of 90–110° C. although temperatures below 90° C. may be used. The pH of the resin forming solution may be either acid or alkaline but, for optimum results, it is desired to control the pH within the range of 3-10.

During the dehydration step, the resin-forming solution is subjected to either vacuum or azeotropic distillation until all of the free and liberated water is substantially removed. The hydrocarbon solvent is then removed from the resin solution. When dehydrated by azeotropic distillation, thereafter, the resinous material is heated until a water insoluble solid resin precipitates upon the addition of water and until the viscosity of a 40% solids solution of the resin in ethylene glycol is between H and $Z_6$ on the Gardner-Holdt scale, at 25° C. For most applications of the resin in the production of printing inks, it is preferred that the viscosity of a 40% solids solution of the resin in the ethylene glycol is between Y—$Z_3$ on the Gardner-Holdt scale at 25° C. When the expression "glycolated" dicyandiamide resins is used, I mean an ether of the methylol derivative of dicyandiamide and a glycol.

The particular glycols which may be used in the practice of the process of the present invention are ethylene glycol, propylene and diethylene glycol. These are the preferred glycols. It is possible to use other glycols and other polyhydric alcohols, such as dipropylene glycol, glycerol, glycerol monoethers, and the like. If it is desired to modify the dicyandiamide resins with phenols and/or aromatic amines, one may use as modifying glycols in addition to those set forth hereinabove, butylene glycol and higher glycols. The mol ratio of glycols to dicyandiamide may be varied over the range of 1:1 to 1:6.

In addition to formaldehyde, one may use in the practice of the process of the present invention, materials and compounds engendering formaldehyde such as paraformaldehyde, trioxymethylene, paraldehyde, hexamethylene-tetramine and the like. These are the preferred aldehydes but it is possible to use other aliphatic aldehydes such as acetaldehyde, crotonic aldehyde, butyraldehyde, acrolein and the like or aromatic or heterocyclic aldehydes such as benzaldehyde, furfural and the like. The molar proportions of aldehydes which may be used in the preparation of these resins may vary between about 1 and 3 mols per mol of dicyandiamide.

Among those solvents which may be used in the practice of the process of the present invention, the following are utilizable: benzene, n-hexane, and n-heptane, cyclohexane, and the like.

It has been set forth hereinabove, in general terms, the process for the preparation of the resins of the present invention. In order that this process may be more completely understood, the following examples are set forth for the purpose of illustration only and are not to be interpreted as a limitation on the case except as indicated in the appended claims. All parts are parts by weight.

*Example 1*

84 parts of dicyandiamide (1 mol) and 162 parts of a 37% aqueous solution of formaldehyde (2 molar equivalents), 93 parts of ethylene glycol (1.5 mols), 5 parts of a 28% aqueous solution of ammonia, and 20 parts of cyclohexane are introduced into a suitable reaction vessel equipped with a stirrer, thermometer, and arrangements for direct reflux and azeotropic distillations. The charge is heated and stirred until gentle reflux (75–78° C.) takes place. The batch is held at that temperature for approximately one hour, which is a sufficient period of time to permit the formation of methylol dicyandiamide. Thereupon, azeotropic distillation is started to form the ether derivative and continued until approximately 135 parts of water layer have been removed. The cyclohexane is then distilled off by heating to 110°–120° C. while blowing the batch with an inert gas, preferably nitrogen, until no hydrocarbon further distills off. The heating is then continued at a temperature above 100° C. until the desired viscosity has been obtained. If a very low viscous resin solution is desired, the hydrocarbon should be boiled off below 100° C. The blowing with nitrogen will remove substantially all of the cyclohexane. The progress of "bodying" of the resin solution can be measured by checking the viscosity at regular intervals with Gardner-Holdt standard viscosity tubes or by exposing the thin film of resin solution to steam or running water. At the beginning of the "bodying" procedure, the white film formed by the latter method of examination is first water dispersible and sticky, then water insoluble but still soft and tacky, finally water insoluble, solid and non-tacky. The viscosity of the resin solution diluted 2:1 with ethylene glycol at this stage is about Z2 on the Gardner-Holdt scale at 25° C. The viscosity of a 40% resin solids solution in ethylene glycol, is about Y–Z on the Gardner-Holdt scale at 25° C.

A black ink may be prepared with the resin solution of Example 1 by combining 31 parts of the resin solution, 9 parts of ethylene glycol, 10 parts of carbon black, 5 parts of furfuryl alcohol. This ink, printed on coated paper, dried in 20–25 minutes; on bond paper it dried in 30–40 minutes. When the prints are exposed to steam, they set to non-offsetting conditions immediately so that additional sheets can be stacked on top of one another. It also hardens very quickly when exposed to high temperatures such as those used in drying heat-setting inks.

A weighed amount of this ink (2.0 grams) was spread over one square foot of glass plate. At the same time, a commercial heat set ink was exposed in the same manner. Proof prints were made every 15 minutes and compared for drying rates over a hot plate. The commercial ink required about twice the length of time for forming a dry ink film during heat setting than the ink of the present invention. After 45 minutes, the commercial ink failed to transfer sheets from the glass plate to the paper, while the ink of the present invention printed without any difficulties. The latter ink started to fail only after 2¼ hours after the test was started.

*Example 2*

84 parts of dicyandiamide (1 mol), 192 parts of ethylene glycol (3.1 mols), 162 parts of a 37% aqueous solution of formaldehyde, and 5 parts of a 28% aqueous solution of ammonia, are introduced into a suitable reaction chamber and brought to reflux (about 80°–85° C.) and the charge is held at that temperature for approximately one hour. Thereupon, 20 parts of cyclohexane are added and the resin-forming solution is treated in the same manner as Example 1. The final viscosity of a 40% resin solids solution in ethylene glycol was about P–Q on the Gardner-Holdt scale at 25° C.

*Example 3*

Charge 84 parts of dicyandiamide (1 mol), 162 parts of a 37% aqueous formaldehyde solution (2 mols), 62 parts of ethylene glycol (1 mol), 5 parts of a 28% aqueous solution of ammonia, and 20 parts of cyclohexane into a suitable reaction chamber and treat in the same manner as that set forth in Example 1 hereinabove, except that 115 parts of water are distilled off. A 40% resin solids solution in ethylene glycol had a viscosity at 25° C. of approximately S–T on the Gardner-Holdt scale.

*Example 4*

168 parts of dicyandiamide (2 mols), 162 parts of a 37% aqueous formaldehyde solution (2 molar equivalents), 124 parts of ethylene glycol (2 mols) and 5 parts of a 28% aqueous solution of ammonia, and 20 parts of cyclohexane are charged into a suitable reaction vessel and treated in the same manner as that set forth in Example 1, except that 128 parts of water are distilled off. A 40% resin solids solution in ethylene glycol had a viscosity of approximately H on the Gardner-Holdt scale at 25° C.

*Example 5*

Charge 84 parts of dicyandiamide (1 mol), 402 parts of dipropylene glycol (3 mols), 163 parts of a 37% aqueous solution of formaldehyde (2 molar equivalents) 5 parts of a 28% aqueous solution of ammonia, and 30 parts of cyclohexane into a suitable reaction chamber and treat in the same manner as that process set forth in Example 1. The final viscosity of the resin solution diluted 2:1 with ethylene glycol is approximately J on the Gardner-Holdt scale at 25° C. The viscosity of a 40% resin solids solution in ethylene glycol would be approximately Q—R on the Gardner-Holdt scale at 25° C.

Example 6

Charge 126 parts of dicyandiamide (1.5 mols), 342 parts of propylene glycol (4.5 mols), 244 parts of a 37% aqueous formaldehyde solution (3 molar equivalents), 7.5 parts of a 28% aqueous solution of ammonia, and 30 parts of cyclohexane into a suitable reaction chamber and treat in the same manner as that set forth in Example 1. The final viscosity of the resin solution, thus treated, has a viscosity of approximately Z1 on the Gardner-Holdt scale at 25° C. The viscosity of a 40% resin solids solution in ethylene glycol would be approximately Z6 on the Gardner-Holdt scale at 25° C.

Example 7

Charge 84 parts of dicyandiamide (1 mol), 318 parts of diethylene glycol (3 mols), 163 parts of a 37% aqueous formaldehyde solution (2 mols) and 5 parts of a 28% aqueous solution of ammonia, 30 parts of cyclohexane into a suitable reaction chamber and treat in the same manner as in Example 1. The final viscosity of the resin is approximately V—W on the Gardner-Holdt scale at 25° C. The viscosity of a 40% resin solids solution in ethylene glycol would be approximately V—W on the Gardner-Holdt scale at 25° C.

Example 8

84 parts of dicyandiamide (1 mol), 190 parts propylene glycol (2.5 mols), 163 parts of a 37% aqueous formaldehyde solution, 5 parts of a 28% aqueous solution of ammonia, and 20 parts of cyclohexane are charged into a suitable reaction chamber and treated in the same manner as that set forth in Example 1. The final viscosity of the resin solution is approximately Z5—Z6 on the Gardner-Holdt scale at 25° C. The viscosity of a 40% solids resin solution in ethylene glycol would be approximately Z5—Z6 on the Gardner-Holdt scale at 25° C.

Example 9

84 parts of dicyandiamide (1 mol), 212 parts diethylene glycol (2 mols), 163 parts of a 37% aqueous solution of formaldehyde (2 mols), 5 parts of a 28% aqueous solution of ammonia, 25 parts of cyclohexane are charged into a suitable reaction chamber and treated in the same manner as that set forth in Example 1. The final viscosity of the resin solution is approximately Z4—Z5 on the Gardner-Holdt scale at 25° C. The viscosity of a 40% solids resin solution in ethylene glycol would be approximately S—T on the Gardner-Holdt scale at 25° C.

Example 10

168 parts of dicyandiamide (2 mols), 120 parts paraformaldehyde (4 molar formaldehyde equivalents), 186 parts ethylene glycol (3 mols) and 1 part of calcium oxide are introduced into a suitable reaction chamber provided with stirrer, thermometer, and reflux condenser and the charge is heated gradually to about 100° C. in a 1 hour period. The heating is then stopped but the temperature gradually rises to about 110° C. due to polymerization taking place. The stirring is continued without heating. When the temperature drops to 105° C., it is held at that temperature, plus or minus 2° C. until the viscosity of the resin solution when diluted 2:1 with ethylene glycol is approximately V on the Gardner-Holdt scale at 25° C. The viscosity of a 40% solids resin solution in ethylene glycol is approximately U—V on the Gardner-Holdt scale at 25° C.

It is to be noted that in this resin solution, the water is permitted to remain. A black printing ink was prepared by mixing and then milling the following items:

28 parts of the resin solution
12 parts of ethylene glycol
10 parts of carbon black (Neospectra Mark III)
5 parts furfuryl alcohol

Example 11

84 parts dicyandiamide (1 mol), 93 parts diethylene glycol (1.5 mols), 163 parts of a 37% aqueous formaldehyde solution (2 molar equivalents), 5 parts of a 28% aqueous solution of ammonia, and 20 parts of cyclohexane are charged into a suitable reaction chamber equipped with thermometer, stirrer, and reflux condenser and are heated until gentle reflux takes place at about 75° C. The batch is held at this temperature for about 1 hour and then water is distilled off azeotropically until about 105 parts have been removed. The cyclohexane is then distilled off by raising the temperature to 104° C., while passing nitrogen through the resin solution. Simultaneously, the resin solution becomes more viscous, and it is held at approximately this temperature to effect "bodying" until the viscosity of a 40% resin solids solution in ethylene glycol would be approximately H on the Gardner-Holdt scale at 25° C. This "bodying" step will generally take about 2 hours. In this resin solution, the water formed during polymerization remains in the solution. A suitable black printing ink was formed on the basis of the formulation set forth hereinabove under Example 10.

The inks made with the resins of the instant invention are suitable for letterpress and gravure printing and when so used they dry with a high luster and with very hard, smudgeproof surfaces.

The resins of the present invention may be used in printing inks which are suitable in air drying printing processes at elevated temperature or at room temperature. When these air drying printing inks are imprinted on paper, the solvent of the resin solution is partially but readily adsorbed (some of the solvent evaporates) leaving a dry film on the paper. Within a half hour to 1 hour period, these air dried ink films have smudgeproof surfaces which permit "backing up" within an additional ½ hour to 1 hour period. ("Backing up" is the process of reversing the printed sheets after an impression has been made on one side and feeding the same sheet through the press for another impression).

The resins of the present invention may be still further used in heat setting printing inks by use of a propylene glycol, ethylene glycol or butandiol as the solvent for the resin. When these printing inks are applied in thick films (as on press rollers) at room temperature, the inks dry slowly. The solvent has a slow evaporation rate at room temperature, whereas at the more elevated temperatures, the lower glycols evaporate rapidly from the printed film. The fact that the resin has no tendency to retain the solvent aids considerable in this fast-drying heat-setting printing process. Some resins, such as rosin modified phenolics and limed or zincated rosins, retain considerable amounts of solvent and consequently are not fast drying.

The resins of the present invention are suitable for use in steam setting printing inks because the glycols used as solvents are water soluble but the resins are water insoluble. The resins themselves have a marked degree of water tolerance, i. e., the glycol can absorb some moisture without causing the precipitation of the resin. This property is advantageous as the inks will not cake on the press but retain their capability of being transferred even at comparatively high humidities. However, when the ink films are exposed to steam, they are changed very quickly from plastic to a solid. In the prior art, it has not been possible to impart gloss to these inks, which are "set" by steam but rather are very dull in appearance. The ink containing the glycol solution of the dicyandiamide resins "steam-set" with a very good luster.

In the preparation of the resins of the present invention, it is preferred that the process be performed in the presence of the glycol solvent. The reagents, dicyandiamide, aqueous formaldehyde and glycol are charged into the reaction kettle and the adduct of dicyandiamide is formed. This reaction may be carried out at temperatures varying between the range of 20° C. and 105° C. It is actually preferred, however, to react the reagents at a temperature within the range of 60–100° C. It is further preferred to keep the charge slightly on the alkaline side and this may be accomplished by the use of an alkaline agent such as calcium hydroxide, sodium hydroxide, sodium carbonate, primary amines, guanidine, or polyamines; but it is preferred to use ammonia. After heating for about one hour at 75–95° C., the reaction has proceeded far enough to start the dehydration in order to eliminate the water introduced with the formaldehyde solution and also the water produced in the course of the reaction. This dehydration may be accomplished by vacuum distillation but azeotropic distillation is to be preferred. This latter method of distilling off of the water is novel in the preparation of the amino resins. This is of particular importance when considering a process for the dehydration of dicyandiamide aldehyde syrups containing glycols. By accomplishing the formation of the dicyandiamide aldehyde adduct in the presence of the glycols, one is permitted to practice a 1-step operation. In the prior art, the steps in the process generally were (1) adduct formation, (2) dehydration under vacuum, and (3) alkylation with the necessary interruptions between successive steps. In the present operation, all reagents are charged initially and after 1 hour of reflux while continuing heating, the system may be converted from reflux to dehydration by azeotropic distillation. Since the resinous products of the present invention have their final application generally in printing inks, which may come in contact with rubber rollers, liquids of low solvency (or low kauri-butanol value) are chosen for the azeotropic distillation. A further selection is made with respect to boiling points of the solvent wherein it is desired that the solvents selected have boiling points below the boiling point of water. The preferred liquids are the paraffinic hydrocarbons, such as hexane and cyclohexane. One should not infer from this, however, that benzol cannot be used. This latter solvent is suitable. However, complete exhaustion of the solvent from the final product would be required should the end use be in printing inks which are to be used on presses with rubber rollers. Hexane and cyclohexane have the additional advantage over benzol in that they can be removed more easily from glycols than benzol and other aromatic hydrocarbons.

Among the preferred glycols which may be used in the practice of the process of the present invention are ethylene glycol, propylene glycol and diethylene glycol. Other useful glycols and polyhydric alcohols include dipropylene glycol, glycerol, and glycerol monoethers. When the resins of the present invention are modified with such materials as phenols and aromatic amines, one may use glycols in addition to those set forth hereinabove, such as butylene glycol and the higher glycols.

The resins of the present invention may be modified by the addition of certain aldehyde reactive materials such as phenol, aniline, bisphenol, cresol, tar oil acids, cresylic acids, naphthol, and the like.

Example 12

42 parts of dicyandiamide (0.5 mol), 162 parts of a 37% aqueous solution of formaldehyde (2 molar equivalents), 135 parts of butanediol 1,3 (1½ mols), 5 parts of a 28% ammonium hydroxide solution and 20 parts of cyclohexane are introduced into a suitable reaction chamber equipped with a stirrer, thermometer, and arrangements for direct reflux and azeotropic distillations. The charge is heated and stirred until gentle reflux takes place (75–78° C.). The batch is held at that temperature for approximately 1 hour, thereupon azeotropic distillation is started and continued until approximately 128 parts of water are removed. The cyclohexane is then distilled off by heating to 110–120° C. while blowing the batch with an inert gas, preferably nitrogen until no further hydrocarbon distills off. The heating is then continued at a temperature above 100° C. until the desired viscosity has been reached.

Example 13

23.3 parts of aniline and 63 parts of dicyandiamide, 162 parts of a 37% aqueous solution of formaldehyde, 190 parts of propylene glycol, 5 parts of a 28% solution of ammonium hydroxide and 10 parts of cyclohexane are charged into a suitable reaction chamber and treated in the same manner as that set forth in Example 12. The final viscosity of this resinous mixture is between Y and Z on the Gardner-Holdt scale. The viscosity of a 40% solids resin solution in ethylene glycol would be between M and N on the Gardner-Holdt scale at 25° C.

Example 14

11.8 parts of phenol, 11.6 parts of aniline, 63 parts of dicyandiamide, and 162 parts of a 37% aqueous formaldehyde solution, 190 parts of propylene glycol, 5 parts of a 28% solution of ammonium hydroxide, and 10 parts of cyclohexane are introduced into a suitable reaction chamber and treated in the same manner as in Example 12. The viscosity of this resinous solution was between Y and Z on the Gardner-Holdt scale at 25° C. The viscosity of a 40% resin solids solution in ethylene glycol would be between M and N on the Gardner-Holdt scale at 25° C.

Example 15

42 parts of dicyandiamide, 23 parts of phenol, 23 parts aniline, 189 parts of butanediol, 162 parts of a 37% aqueous formaldehyde solution, 5 parts of ammonia, 20 parts of cyclohexane are introduced into a suitable reaction chamber and treated in the same manner as set forth in Example 12. The resultant viscosity of the resin is approximately Y to Z on the Gardner-Holdt scale at 25° C. The viscosity of this resin solution in ethylene glycol would be about I—J on the Gardner-Holdt scale at 25° C. and at 40% resin solids.

Example 16

63 parts of dicyandiamide, 23 parts phenol, 190 parts of propylene glycol, 162 parts of a 37% aqueous formaldehyde solution, 5 parts of a 28% solution of ammonium hydroxide, 20 parts cyclohexane are introduced into a suitable reaction chamber and treated in the same manner as that set forth in Example 12. The resultant resin solution has a viscosity of approximately Y—Z on the Gardner-Holdt scale at 25° C. The viscosity of this resin solution in ethylene glycol would be about M—N on the Gardner-Holdt scale at 25° C. and at 40% resin solids.

Example 17

63 parts of dicyandiamide, 23 parts of phenol, 162 parts of a 37% aqueous formaldehyde solution, 95 parts of propylene glycol, and 20 parts of cyclohexane are introduced into a suitable reaction chamber and heated to a gentle refluxing temperature (75–80° C.) and is held at that temperature for about 1 hour. Thereafter, the water is distilled off azeotropically until about 130 parts of water have been collected (at 75–92° C.) after which the cyclohexane is distilled off at about 95° C. and the contents are further heated until the desired product is obtained. The batch was then reacted until the viscosity of a sample, diluted with 1 part propylene glycol/2 parts resin solution was about X—Y on the Gardner-Holdt scale at 25° C. The viscosity of this resin solution in ethylene glycol would be about I—J on the Gardner-Holdt scale at 25° C. and at 40% resin solids.

Example 18

42 parts of dicyandiamide, 57 parts of bisphenol (p-p'-dihydroxydiphenyl dimethyl methane), 122 parts of a 37% aqueous formaldehyde solution, 5 parts of a 28% solution of ammonium hydroxide, 90 parts of butanediol-1,3 are introduced into a suitable reaction chamber and treated in the same manner as that set forth in Example 17 until about 85 parts of water have been collected by azeotropic distillation, then boiling off the cyclohexane and bodying the resin until the desired properties are obtained. The viscosity of a resin sample diluted with 1 part butanediol-1,3 per 2 parts of resin solution obtained after bodying for ½ hour at 102°–105° C. was Z1—Z2 on the Gardner-Holdt scale at 25° C.

A white printing ink may be prepared by mixing 80 parts of the resin solution as prepared in Example 18 above, 170 parts of titanium oxide (non-chalking pigment) and 25 parts of butyl Cellosolve and then milling to a uniform consistency.

The partially prepolymerized unmodified glycolated dicyandiamide-formaldehyde resins are to be preferred over the dicyandiamide modified resins, although the latter resins are still useful, notwithstanding the fact that they are softer products. These modified resins will harden when exposed to heat. Among the soft resins, those compositions containing phenols or aniline or both are especially preferred as these resins spontaneously polymerize at room temperature after the solvent has evaporated. At heat setting temperatures, the soft resins will polymerize although the hardening of inks containing the soft resins is somewhat slower than the partially prepolymerized unmodified resins.

The following examples illustrate various miscellaneous inks which may be prepared by the use of the resins of the present invention. These inks are prepared by mixing and blending the pigment and vehicle in the conventional manner.

Example 19

BENZIDINE YELLOW INK 20 parts benzidine yellow, 80 parts vehicle (prepared according to Example 2).

Example 20

CHROME YELLOW INK 60 parts chrome yellow, 40 parts vehicle (resin prepared according to Example 2), 20 parts of vehicle (resin prepared according to Example 11).

Example 21

LITHOL RED INK 20 parts of lithol red, 40 parts of the vehicle (resin solution prepared according to Example 2).

Example 22

PEACOCK BLUE INK 20 parts of peacock blue and 70 parts vehicle (prepared according to Example 2).

Example 23

PHTHALOCYANINE BLUE INK 20 parts phthalocyanine blue, 64 parts vehicle (prepared according to Example 2).

In these ink formulations, the resin solutions prepared according to Example 2 were used primarily as the vehicle. All of the other vehicles as shown in the other examples can be substituted either directly, if the viscosity is about the same as the resin solution of Example 2 or indirectly, if the viscosity is adjusted to the desired value by dilution with a glycol. The consistency of the inks may be varied by using either a vehicle of higher or lower viscosity or by use of a combination of vehicles as shown in Example 20 for chrome yellow ink.

All of the inks prepared have good flow properties when their thixotropic structure is broken down. It is not necessary to impart any other ingredients to the inks in order to have them perform properly on the press. The black ink, however, shown under Example 1 contains added furfuryl alcohol which is incorporated into the ink for the purpose of improving the plastic flow and the leveling properties of the ink. Without a flow promoter, this ink has a tendency to be gellike. In addition to furfuryl alcohol, other compounds may be added to the inks for the purpose of imparting plastic flow to carbon black inks made with resins of the present invention, such as furoic acid, diglycolic acid, diamyl phosphoric acid, octanoic acid, 2-ethyl hexoic, pelargonic acid, 2-nitro-1-butanol, ether lactate, butyl lactate, glycidyl phenyl ether, glycidyl isopropyl ether, phenol Cellosolve, glyceryl xylenol ether, furfural, diethylene glycol, bis (chloro formate) and the like. These compounds have the tendency to impart very good flow to carbon black inks which contain comparatively high concentrations of carbon black such as 17%–20% by weight. The amounts of flow promoters recommended generally for addition to the vehicle vary between about 2% and 10%. The acids set forth hereinabove in the list of flow promoters may be added in amounts of about 2–5%. All of the other compounds may be added in amounts of from 5–10% and in these proportions these compounds will impart very good flow to the ink. There are a considerable number of other compounds which may be used to impart good flow to these inks and it should be remembered that the list of compounds set forth hereinabove is solely for the purpose of illustration, and should not be interpreted as a limitation on the case. These compounds set forth above are representative or a few of the compounds which may be so used and which are readily available. Amongst the other compounds which may be used as flow promoters are the half esters of dicarboxylic acids. These compounds are mentioned because they can easily be prepared from the corresponding anhydrides of the dicarboxylic acids by coreaction with polyhydric alcohols in equimolecular portions.

The resins of the present invention are insoluble in the higher alcohols and in hydrocarbons. This feature makes these resins adaptable for immediate overprinting with overprint varnishes of the oil type or lacquers of nitrocellulose or the like. When overprinting is done, no time for the drying of the ink films need be allowed.

In addition to the application of the resins of the present invention in the field of printing inks, these resins may be adapted to use in paper coatings and as adhesives.

I claim:

1. A process for preparing a water insoluble glycolated dicyandiamide formaldehyde resin comprising partially prepolymerizing a glycol, formaldehyde, and dicyandiamide, in a mol ratio varying between about 1:1:1 and 6:3:1, respectively, by heating, under alkaline conditions, until the ether derivative of the methylol dicyandiamide is substantially completely formed, adding thereto a mutually inert hydrocarbon solvent having a boiling point below 100° C., polymerizing said ether derivative and subjecting said derivative to distillation until all free and liberated water is substantially removed, removing from said derivative substantially all of said hydrocarbon solvent, thereafter heating until a water insoluble solid resin precipitates upon the addition of water wherein said glycol is a member selected from the group consisting of ethylene glycol, propylene glycol, diethylene glycol, dipropylene glycol, butylene glycol, butanediol, glycerol and glycerol monoethers.

2. A process for preparing a water insoluble glycolated dicyandiamide formaldehyde resin comprising partially prepolymerizing a glycol, formaldehyde, and dicyandiamide, in a mol ratio varying between about 1:1:1 and 6:3:1, respectively, by heating, under alkaline conditions, until the ether derivative of the methylol dicyandiamide is substantially completely formed, adding thereto a mutually inert hydrocarbon solvent having a boiling point below 100° C., polymerizing said ether derivative and subjecting said derivative to azeotropic distillation until all free and liberated water is substantially removed, removing from said derivative substantially all of said hydrocarbon solvent, thereafter heating until a water insoluble solid resin precipitates upon the addition of water wherein said glycol is a member selected from the group consisting of ethylene glycol, propylene glycol, diethylene glycol, dipropylene glycol, butylene glycol, butanediol, glycerol and glycerol monoethers.

3. A process for preparing a water insoluble glycolated dicyandiamide formaldehyde resin comprising partially prepolymerizing ethylene glycol, formaldehyde, and dicyandiamide, in a mol ratio varying between about 1:1:1 and 6:3:1, respectively, by heating, under alkaline conditions, until the ether derivative of the methylol dicyandiamide is substantially completely formed, adding thereto a mutually inert hydrocarbon solvent having a boiling point below 100° C., polymerizing said ether derivative and subjecting said derivative to azeotropic distillation until all free and liberated water is substantially removed, removing from said derivative substantially all of said hydrocarbon solvent, thereafter heating until a water insoluble solid resin precipitates upon the addition of water.

4. A process for preparing a water insoluble glycolated dicyandiamide formaldehyde resin comprising partially prepolymerizing diethylene glycol, formaldehyde, and dicyandiamide, in a mol ratio varying between about 1:1:1 and 6:3:1, respectively, by heating, under alkaline conditions, until the ether derivative of the methylol dicyandiamide is substantially completely formed, adding thereto a mutually inert hydrocarbon solvent having a boiling point below 100° C., polymerizing said ether derivative and subjecting said derivative to azeotropic distillation until all free and liberated water is substantially removed, removing from said derivative substantially all of said hydrocarbon solvent, thereafter heating until a water insoluble solid resin precipitates upon the addition of water.

5. A process for preparing a water insoluble glycolated dicyandiamide formaldehyde resin comprising partially prepolymerizing propylene glycol, formaldehyde, and dicyandiamide, in a mol ratio varying between about 1:1:1 and 6:3:1, respectively, by heating, under alkaline conditions, until the ether derivative of the methylol dicyandiamide is substantially completely formed, adding thereto a mutually inert hydrocarbon solvent having a boiling point below 100° C., polymerizing said ether derivative and subjecting said derivative to azeotropic distillation until all free and liberated water is substantially removed, removing from said derivative substantially all of said hydrocarbon solvent, thereafter heating until a water insoluble solid resin precipitates upon the addition of water.

6. A water insoluble polymerizable glycolated dicyandiamide-formaldehyde resin wherein the mol ratios of glycol, dicyandiamide and formaldehyde varies between about 1:1:1 and 6:1:3, respectively prepared by heat reacting the components under alkaline conditions wherein said glycol is a member selected from the group consisting of ethylene glycol, propylene glycol, diethylene glycol, dipropylene glycol, butylene glycol, butanediol, glycerol and glycerol monoethers.

7. A water insoluble polymerizable ethylene glycolated dicyandiamide - formaldehyde resin wherein the mol ratios of ethylene glycol, dicyandiamide and formaldehyde varies between about 1:1:1 and 6:1:3, respectively prepared by heat reacting the components under alkaline conditions.

8. A water insoluble polymerizable diethylene glycolated dicyandiamide - formaldehyde resin wherein the mol ratio of diethylene glycol, dicyandiamide and formaldehyde varies between about 1:1:1 and 6:1:3, respectively prepared by heat reacting the components under alkaline conditions.

9. A water insoluble polymerizable propylene glycolated dicyandiamide - formaldehyde resin wherein the mol ratios of propylene glycol, dicyandiamide and formaldehyde varies between about 1:1:1 and 6:1:3, respectively prepared by heat reacting the components under alkaline conditions.

10. A printing ink comprising a glycol solution of a water insoluble polymerizable glycolated dicyandiamide formaldehyde resin and pigment wherein the mol ratio of glycol, dicyandiamide and formaldehyde varies between 1:1:1 and 6:1:3, respectively prepared by heat reacting the components under alkaline conditions wherein said glycol is a member selected from the group consisting of ethylene glycol, propylene glycol, diethylene glycol, dipropylene glycol, butylene glycol, butanediol, glycerol and glycerol monoethers.

ALFRED F. SCHMUTZLER.

REFERENCES CITED

The following references are of record in the file of this patent:

UNITED STATES PATENTS

| Number | Name | Date |
|---|---|---|
| 2,168,477 | Hodgins | Aug. 8, 1939 |
| 2,191,957 | Edgar | Feb. 27, 1940 |
| 2,317,181 | D'Alelio | Apr. 20, 1943 |

FOREIGN PATENTS

| Number | Country | Date |
|---|---|---|
| 545,081 | Great Britain | May 11, 1942 |
| 850,892 | France | Sept. 18, 1939 |